(12) United States Patent
Crowder et al.

(10) Patent No.: US 10,384,144 B2
(45) Date of Patent: Aug. 20, 2019

(54) TRAVEL CASE FOR PORTABLE PEPPER'S GHOST ILLUSION SETUP

(71) Applicant: VENTANA 3D, LLC, Van Nuys, CA (US)

(72) Inventors: Ashley Crowder, Venice, CA (US); Benjamin Conway, Santa Monica, CA (US); Troy P. Senkiewicz, Toluca Lake, CA (US)

(73) Assignee: VENTANA 3D, LLC, Van Nuys, CA (US)

( * ) Notice: Subject to any disclaimer, the term of this patent is extended or adjusted under 35 U.S.C. 154(b) by 437 days.

(21) Appl. No.: 15/068,117

(22) Filed: Mar. 11, 2016

(65) Prior Publication Data
US 2016/0269673 A1 Sep. 15, 2016

Related U.S. Application Data

(60) Provisional application No. 62/132,905, filed on Mar. 13, 2015.

(51) Int. Cl.
| | |
|---|---|
| *G03H 1/00* | (2006.01) |
| *A63J 21/00* | (2006.01) |
| *H04N 5/89* | (2006.01) |
| *H04N 5/64* | (2006.01) |
| *G03H 1/22* | (2006.01) |
| *H04N 7/15* | (2006.01) |
| *G03B 21/62* | (2014.01) |
| *G03B 21/28* | (2006.01) |

(52) U.S. Cl.
CPC .............. *A63J 21/00* (2013.01); *G03B 21/62* (2013.01); *G03H 1/22* (2013.01); *H04N 5/64* (2013.01); *H04N 5/89* (2013.01); *H04N 7/15* (2013.01); *G03B 21/28* (2013.01)

(58) Field of Classification Search
None
See application file for complete search history.

(56) References Cited

U.S. PATENT DOCUMENTS

| | | | | |
|---|---|---|---|---|
| 6,042,235 A | * | 3/2000 | Machtig | G02B 27/2292 348/14.16 |
| 6,481,851 B1 | * | 11/2002 | McNelley | G02B 27/2292 345/5 |

(Continued)

OTHER PUBLICATIONS

Internet_Archive_2013 DREAMOC HD2_Realfiction_Magic Matters (Year: 2013).*

(Continued)

*Primary Examiner* — Clifford Hilaire
(74) *Attorney, Agent, or Firm* — Behmke Innovation Group LLC; James Behmke; Stephen D. LeBarron

(57) ABSTRACT

Systems and methods herein are directed to a travel case for a portable Pepper's Ghost Illusion setup. In particular, various embodiments are described that provide a road case that folds out into a Pepper's Ghost Illusion system, allowing for extended portability. Specifically, in one embodiment, the portable case may be built for air travel (e.g., less than 50 pounds and less than or equal to 62 linear inches (H+W+D)), using a panel display and space-saving designs for legs, holographic foil and frame, and other components (e.g., remotes, wires, etc.). For example, foam used for cushioning and packaging can double as a stage.

14 Claims, 15 Drawing Sheets

BOUNCE ON CEILING

(56) References Cited

U.S. PATENT DOCUMENTS

2006/0268481 A1* 11/2006 Brown .................. H01R 29/00
                                                    361/58
2011/0273364 A1* 11/2011 Christensen .............. G09F 9/33
                                                    345/7

OTHER PUBLICATIONS

Internet_Archive_2013 Hologram generator for Smartphone and Tablet by Imagination Farm USA LLC (Year: 2013).*
Internet_Archive_Jan_2015 Black Edition—Vanguard | GAEMS (Year: 2015).*
Internet_Archive_Jan_2015 XLT_Anvil Cases (Year: 2015).*
de Wit, T.W., Gill, M., Freemon, S. and Garland, P., 2013. 3Design-Holographic Telecollaboration Interface. (Year: 2013).*

* cited by examiner

TRAVEL CASE FOR PORTABLE PEPPER'S GHOST ILLUSION SETUP

RELATED APPLICATION

This application claims priority to U.S. Provisional Application No. 62/132,905 filed on Mar. 13, 2015 entitled TRAVEL CASE FOR PORTABLE PEPPER'S GHOST ILLUSION SETUP, by Crowder, et al., the contents of which are incorporated herein by reference.

TECHNICAL FIELD

The present disclosure relates generally to holographic projection, and, more particularly, to a travel case for a portable Pepper's Ghost Illusion setup.

BACKGROUND

The "Pepper's Ghost Illusion" is an illusion technique known for centuries (named after John Henry Pepper, who popularized the effect), and has historically been used in theatre, haunted houses, dark rides, and magic tricks. It uses plate glass, Plexiglas, or plastic film and special lighting techniques to make objects seem to appear or disappear, become transparent, or to make one object morph into another. Traditionally, for the illusion to work, the viewer must be able to see into a main room, but not into a hidden room. The hidden room may be painted black with only light-colored objects in it. When light is cast on the room, only the light objects reflect the light and appear as ghostly translucent images superimposed in the visible room.

Notably, Pepper's Ghost Illusion systems have generally remained the same since the 19th Century, adding little more over time than the use of projection systems that either direct or reflect light beams onto the transparent angled screen, rather than using live actors in a hidden room. That is, technologies have emerged in the field of holographic projection that essentially mimic the Pepper's Ghost Illusion, using projectors as the light source to send a picture of an object or person with an all-black background onto a flat, high-gain reflection surface (also referred to as a "bounce"), such as white or grey projection screen. The bounce is typically maintained at an approximate 45-degree angle to the transparent screen surface.

For example, a recent trend in live music performances has been to use a holographic projection of a performer (e.g., live-streamed, pre-recorded, or re-constructed). FIG. 1 illustrates an example of a conventional (generally large-scale) holographic projection system 100. Particularly, the streamed (or recorded, or generated) image of the artist (or other object) may be projected onto a reflective surface, such that it appears on an angled screen and the audience sees the artist or object and not the screen. If the screen is transparent, this allows for other objects, such as other live artists, to stand in the background of the screen, and to appear to be standing next to the holographic projection when viewed from the audience.

Still, despite its historic roots, holographic projection technology is an emerging field, particularly with regards to various aspects of enhancing the illusion and/or managing the setup of the system.

SUMMARY

According to one or more embodiments herein, a travel case for a portable Pepper's Ghost Illusion setup is shown and described. In particular, various embodiments are described that provide a "road case" that folds out into a Pepper's Ghost Illusion system, allowing for extended portability. Specifically, in one embodiment, the portable case may be built for air travel (e.g., less than 50 pounds and less than or equal to 62 linear inches (H+W+D)), using a panel display and space-saving designs for legs, holographic foil and frame, and other components (e.g., remotes, wires, etc.). For example, foam used for cushioning and packaging can double as a stage.

Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
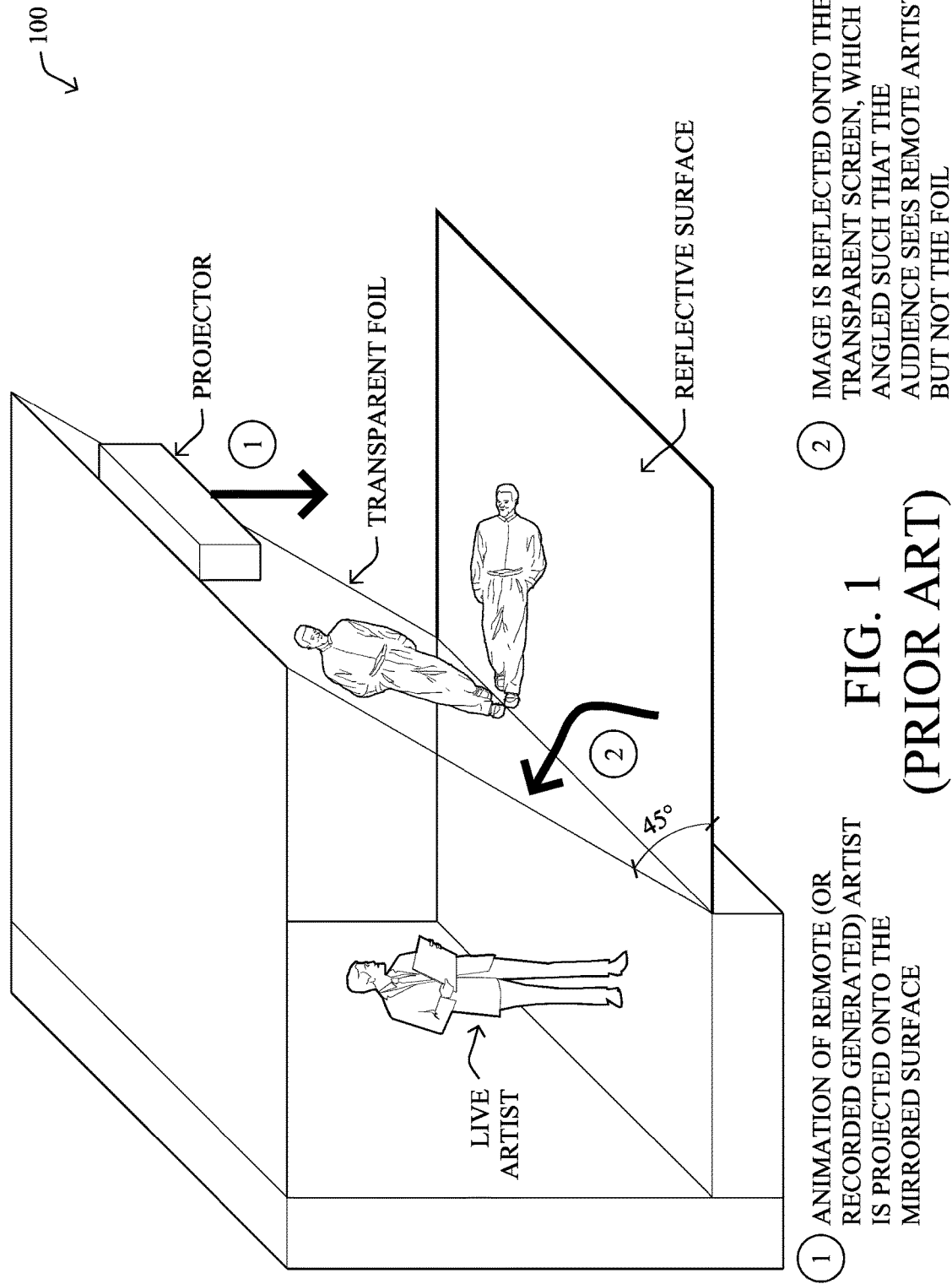
FIG. 1 illustrates an example of well-known holographic projection techniques.

As noted above, the "Pepper's Ghost Illusion" is an illusion technique that uses plate glass, Plexiglas, or plastic film and special lighting techniques to make holographic projections of people or objects. FIG. 1, in particular, illustrates an example of holographic projection using projectors as the light source to send a picture of an object or person with an all-black background onto a flat, high-gain reflection surface (or "bounce"), such as white or grey projection screen. The bounce is typically maintained at an approximate 45-degree angle to the transparent screen surface.

Figure 2:
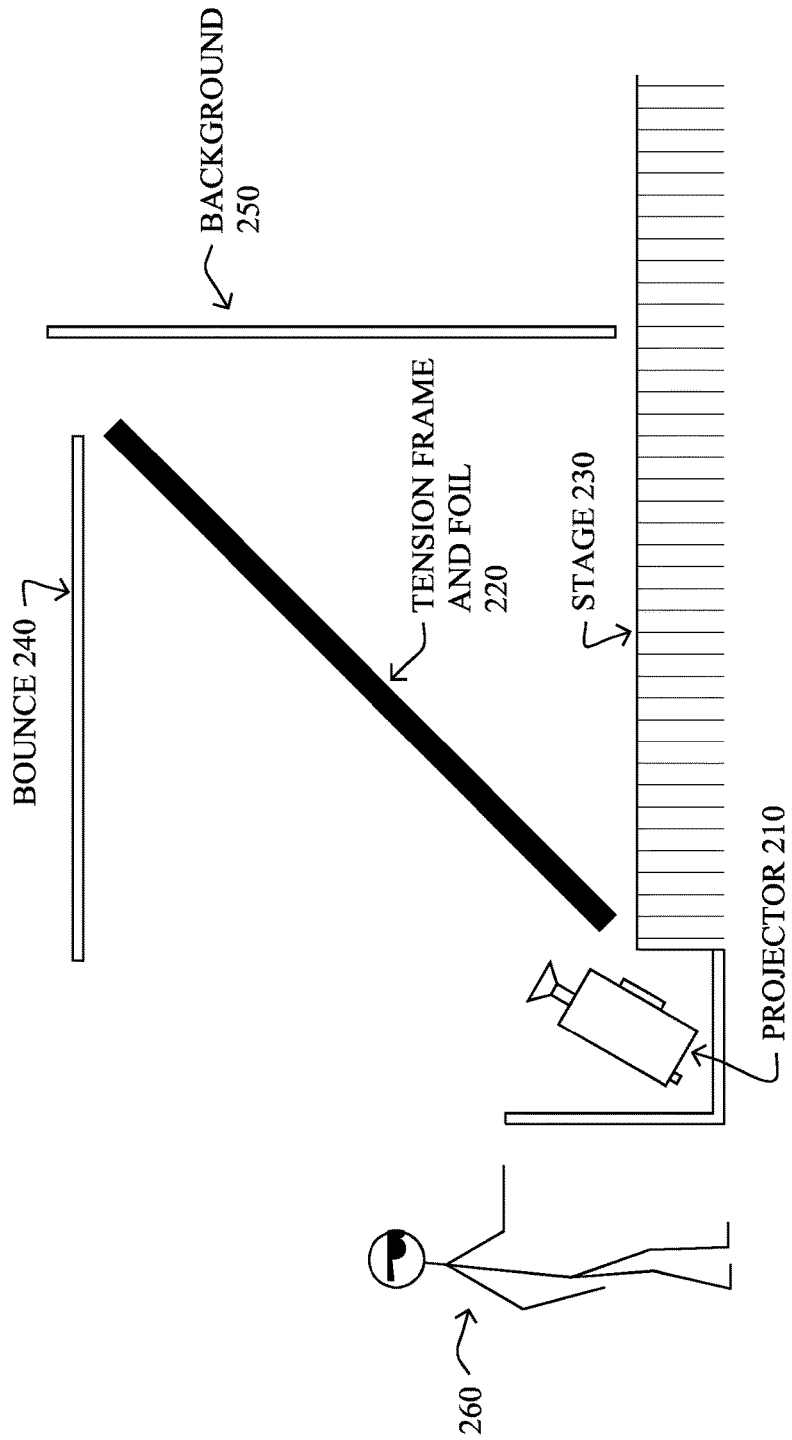
FIG. 2 illustrates an alternative arrangement for a projection-based holographic projection system, namely where the projector is located on the floor, and the bounce is located on the ceiling.

FIG. 2 illustrates an alternative arrangement for a projection-based holographic projection system, namely where the projector 210 is located on the floor, and the bounce 240 is located on the ceiling. The stick figure illustrates the viewer 260, that is, from which side one can see the holographic projection. In this arrangement, the same effect can be achieved as in FIG. 1, though there are various considerations as to whether to use a particular location of the projector 210 as in FIG. 1 or FIG. 2.

Though the projection-based system is suitable in many situations, particularly large-scale uses, there are certain issues with using projectors in this manner. For example, if atmosphere (e.g., smoke from a fog machine) is released, the viewer 260 can see where the light is coming from, thus ruining the effect. Also, projectors are not typically bright enough to shine through atmosphere, which causes the reflected image to look dull and ghost-like. Moreover, projectors are large and heavy which leads to increased space requirements and difficulty rigging.

Figure 3:
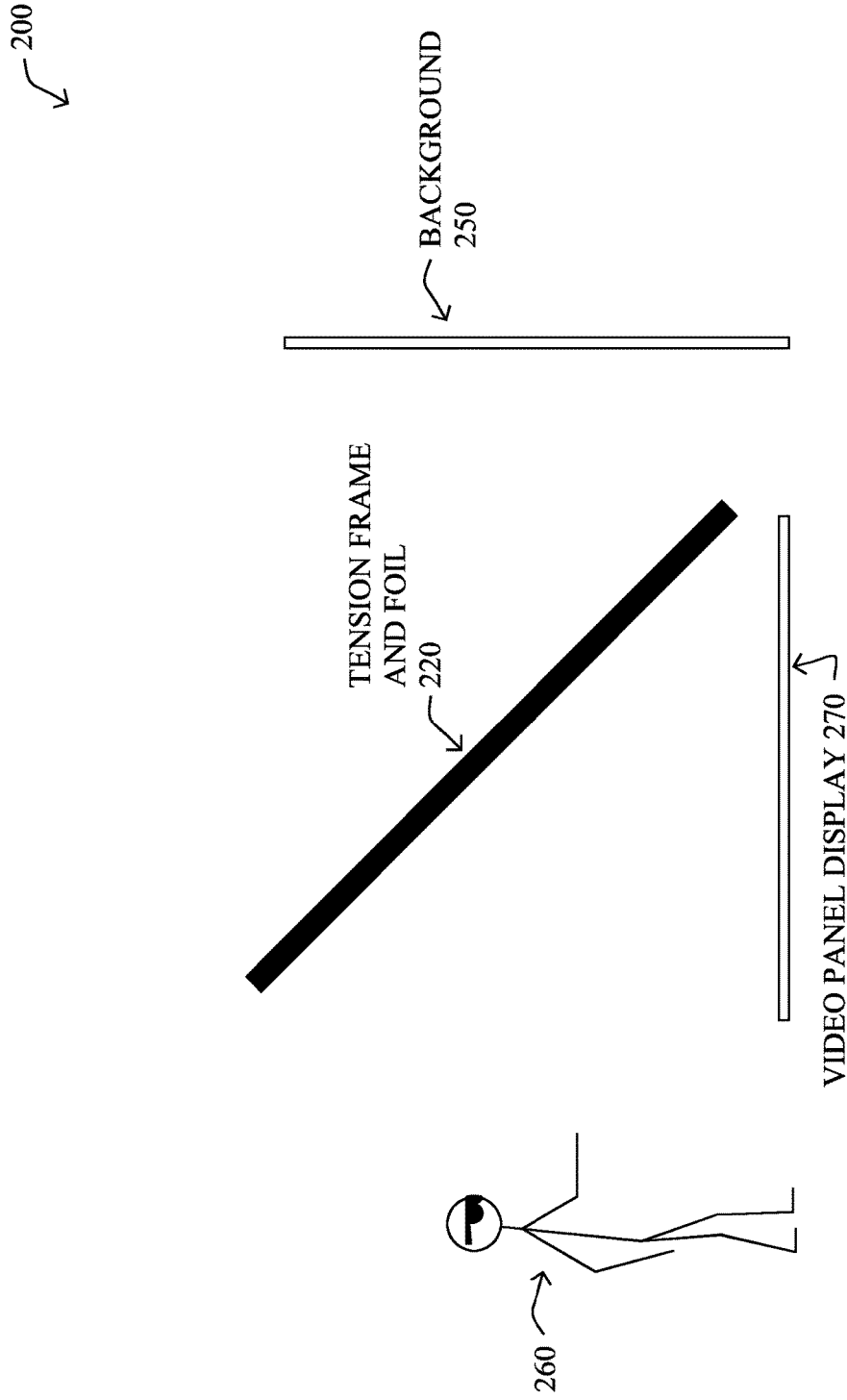
FIG. 3 illustrates an example of a holographic projection system using video panel displays, with the panel below a transparent screen.
Figure 4:
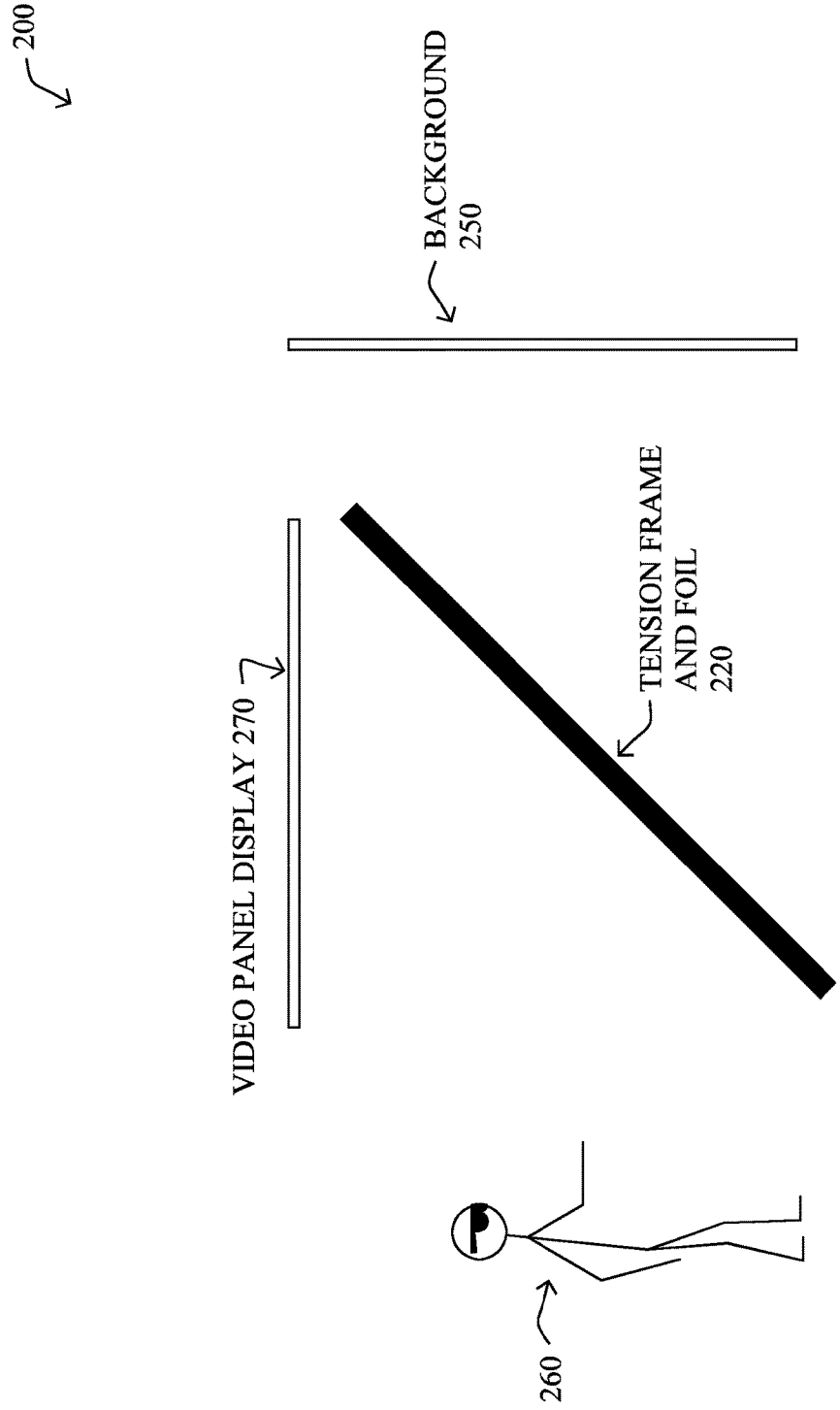
FIG. 4 illustrates an example of a holographic projection system using video panel displays, with the panel above a transparent screen.

Another example holographic projection system, therefore, with reference generally to FIGS. 3 and 4, may be established with video panel displays 270, such as LED or LCD panels, mobile phones, tablets, laptops, or monitors as the light source, rather than a projection-based system. In particular, these panel-based systems allow for holographic projection for any size setup, such as from personal "mini" displays (e.g., phones, tablets, etc.) up to the larger full-stage-size displays (e.g., with custom-sized LCD or LED panels). Similar to the typical arrangement, a preferred angle between the image light source and the reflective yet transparent surface (clear screen) is an approximate 45-degree angle, whether the display is placed below the transparent screen (FIG. 3) or above it (FIG. 4).

Again, the stick figure illustrates the viewer 260, that is, from which side one can see the holographic projection. Note that the system typically provides about 165-degrees of viewing angle. (Also note that various dressings and props can be designed to hide various hardware components and/or to build an overall scene, but such items are omitted for clarity.)

The transparent screen is generally a flat surface that has similar light properties of clear glass (e.g., glass, plastic such as Plexiglas or tensioned plastic film). As shown, a tensioning frame 220 is used to stretch a clear foil into a stable, wrinkle-free (e.g., and vibration resistant) reflectively transparent surface (that is, displaying/reflecting light images for the holographic projection, but allowing the viewer to see through to the background). Generally, for larger displays it may be easier to use a tensioned plastic film as the reflection surface because glass or rigid plastic (e.g., Plexiglas) is difficult to transport and rig safely.

The light source itself can be any suitable video display panel, such as a plasma screen, an LED wall, an LCD screen, a monitor, a TV, a tablet, a mobile phone, etc. A variety of sizes can be used. When an image (e.g., stationary or moving) is shown on the video panel display 270, such as a person or object within an otherwise black (or other stable dark color) background, that image is then reflected onto the transparent screen (e.g., tensioned foil or otherwise), appearing to the viewer (shown as the stick figure) in a manner according to Pepper's Ghost Illusion. However, different from the original Pepper's Ghost Illusions using live actors/objects, and different from projector-based holographic systems, the use of video panel displays reduces or eliminates the "light beam" effect through atmosphere (e.g., fog), allowing for a clearer and un-tainted visual effect of the holographic projection. (Note that various diffusion layers may be used to reduce visual effects created by using video panel displays, such as the Moiré effect.) Also, using a video panel display 270 may help hide projector apparatus, and may reduce the overall size of the holographic system.

Additionally, some video panels such as LED walls are able to generate a much brighter image than projectors are able to generate thus allowing the Pepper's Ghost Illusion to remain effective even in bright lighting conditions (which generally degrade the image quality). The brighter image generated from an LED wall also allows for objects behind the foil to be more well lit than they can be when using projection.

In addition, by displaying an image of an object or person with a black background on the light source, it is reflected onto the transparent flat surface so it looks like the object or person is floating or standing on its own. In accordance with typical Pepper's Ghost Illusion techniques, a stage or background can be put behind and/or in front of the transparent film so it looks like the object or person is standing on the stage, and other objects or even people can also be on either side of the transparent film.

In certain embodiments, to alleviate the large space requirement in setting up a Pepper's Ghost display (e.g., to display a realistic holographic projection, a large amount of depth is typically needed behind the transparent screen), an optical illusion background may be placed behind the transparent screen in order to create the illusion of depth behind the screen (producing a depth perception or "perspective" that gives a greater appearance of depth or distance behind a holographic projection).

In general, holographic projections may be used for a variety of reasons, such as entertainment, demonstration, retail, advertising, visualization, video special effects, and so on. The holographic images may be produced by computers that are local to the projectors or video panels, or else may be generated remotely and streamed or otherwise forwarded to local computers.

As an example, by streaming the video image of the performer as a video and projecting it onto a holographic projection system, a true concert or nightclub experience can be transmitted across the globe for the live entertainment experience. For instance, holographically live-streaming concerts to satellite venues around the globe while maintaining the live concert experience helps artists reach new markets and new revenue streams, while bringing live sets to more fans all across the world. Satellite venues can be configured to have the same concert feel as an actual show: intense lighting effects, great sound quality, bars, merchandise, etc. The only difference is that the performers are not physically present, but are holographically projected from the broadcast venue. The music is streamed directly from the soundboard of the broadcast venue and sent to state-of-the-art sound systems at the satellite venues. Light shows may accompany the performance with top of the line LED screens and lasers.

Figure 5:
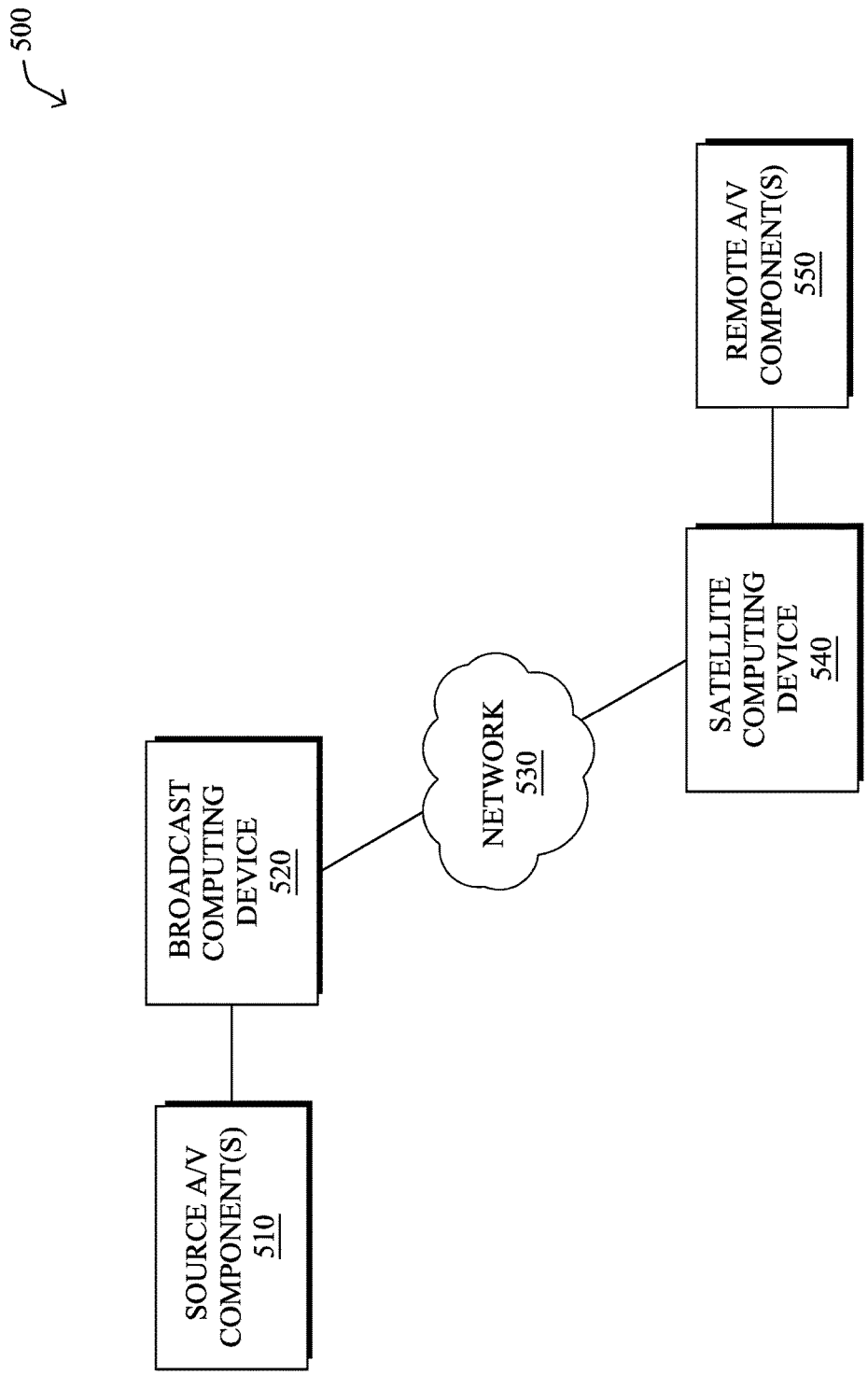
FIG. 5 illustrates an example simplified holographic projection system (e.g., communication network)

For instance, FIG. 5 illustrates an example simplified holographic projection system (e.g., communication network), where the network 500 comprises one or more source A/V components 510, one or more "broadcast" computing devices 520 (e.g., a local computing device), a communication network 530 (e.g., the public Internet or other communication medium, such as private networks), one or more "satellite" computing devices 540 (e.g., a remote computing device), and one or more remote A/V components 550.

In the example above, a broadcast venue may comprise the source A/V components 510, such as where a performance artist is performing (e.g., where a disc jockey (DJ) is spinning) in person. The techniques herein may then be used to stream (relay, transmit, re-broadcast, etc.) the audio and video from this broadcast location to a satellite venue, where the remote A/V components 550 are located. For instance, the DJ in the broadcast location may have the associated audio, video, and even corresponding electronic effects (lights, pyrotechnics, etc.) streamed directly to the satellite venue's A/V system with the same high quality sound as if the musician/artist was playing/singing in person.

As another example, in computing, an "avatar" is the graphical representation of the user (or the user's alter ego or other character). Avatars may generally take either a two-dimensional (2D) form or three-dimensional (3D) form, and typically have been used as animated characters in computer games or other virtual worlds (e.g., in addition to merely static images representing a user in an Internet forum). To control an avatar or other computer-animated model (where, notably, the term "avatar" is used herein to represent humanoid and non-humanoid computer-animated objects that may be controlled by a user), a user input system converts user action into avatar movement.

Figure 6:
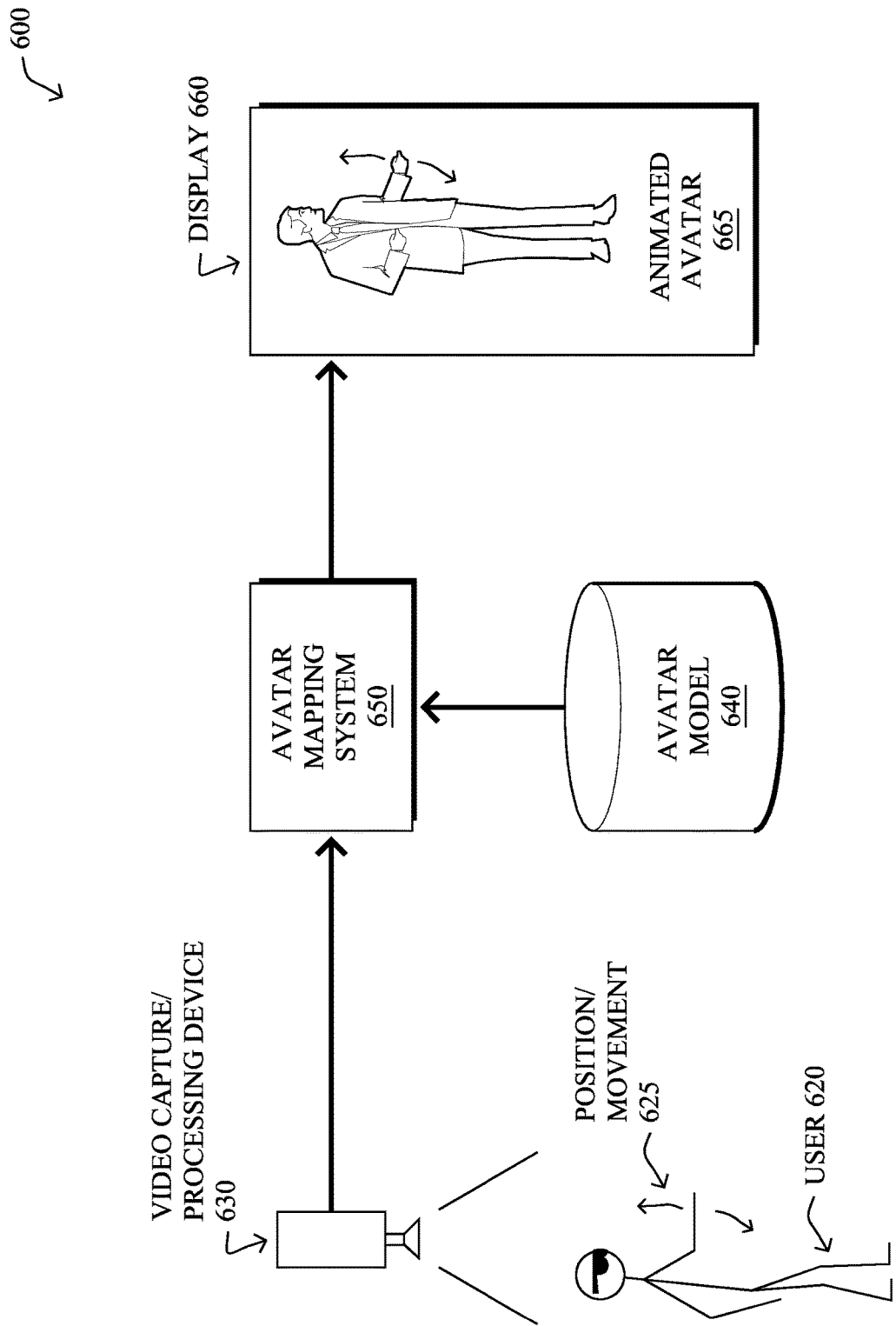
FIG. 6 illustrates a simplified example of an avatar control system.

FIG. 6 illustrates a simplified example of an avatar control system. In particular, as shown in the system 600, a video capture/processing device 610 is configured to capture video images of one or more objects, particularly including one or more users 620 that may have an associated position and/or movement 625. The captured video data may comprise color information, position/location information (e.g., depth information), which can be processed by various body tracking and/or skeletal tracking algorithms to detect the locations of various tracking points (e.g., bones, joints, etc.) of the user 620.

An avatar mapping system 650 may be populated with an avatar model 640, such that through various mapping algorithms, the avatar mapping system is able to animate an avatar 665 on a display 660 as controlled by the user 620. Illustratively, in accordance with the techniques herein the display 660 may comprise a holographic projection of the model animated avatar 665, e.g., allowing an individual to interactively control a holographic projection of a character. (Notably, the avatar mapping system 650 may provide its control functionality in real-time or as a recorded/post-production video feed, and may be co-located with the video processing system 630, remotely located from the video processing system, or as divided components allowing it to be both local to and remote from the video processing system.)

Travel Case for a Portable Pepper's Ghost Illusion Setup

One problem associated with Pepper's Ghost Illusion is that typical arrangements are large and require ample space and equipment for setup. For instance, as mentioned above, many large configurations (e.g., stage-size) may require rigging, multiple skilled people, and hours of assembly, particularly for projection-based illusions. On the other hand, smaller configurations, such as for video panel displays, still require a certain degree of setup and equipment to operate. Even with such smaller configurations, portability of the equipment is an important consideration, in addition to ease of use and setup.

As mentioned above, a travel case for a portable Pepper's Ghost Illusion setup is described herein that provides a road case that folds out into a Pepper's Ghost Illusion system, allowing for extended portability. Specifically, in one embodiment, the portable case may be built for air travel, which currently must meet the weight and dimension restrictions of being less than 50 pounds and less than or equal to 62 linear inches total in height, width, and length (H+W+L) (i.e., the current baggage restriction for normal checked luggage for many major airlines). The setup herein, in particular, illustratively uses a video panel display and defines space-saving designs for legs, a holographic foil and frame, as well as for other components (e.g., remotes, wires, etc.).

Figure 7:
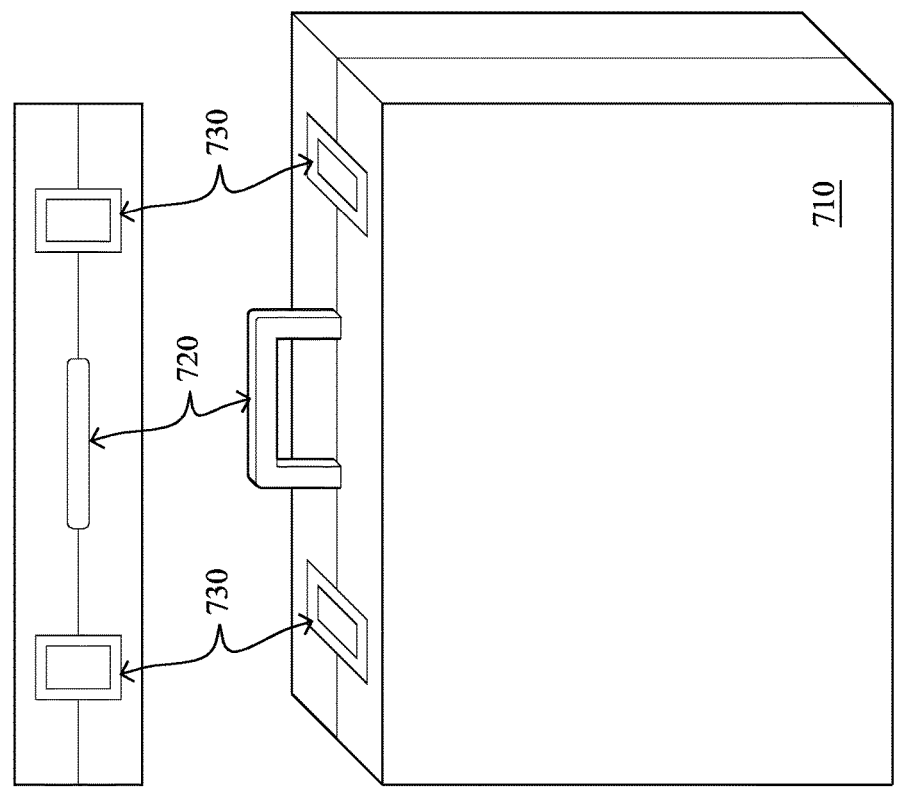
FIG. 7 illustrates an example travel case for a portable Pepper's Ghost Illusion setup in a closed position in accordance with one or more embodiments herein.
Figure 7:
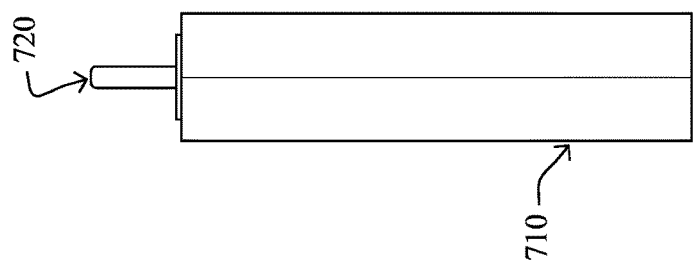

With reference to FIG. 7, a travel case 700 is shown, particularly where the outside 710 of the travel case is shown from various angles, and generally may comprise a handle 720, various latches 730, and so on. In one embodiment, the outside of the travel case 710 may be built in a manner similar to road cases for musicians and/or audio/video equipment, as will be appreciated by those skilled in the art, e.g., where the corners are reinforced with metal, the latches are recessed into the case, etc.

Figure 8A:
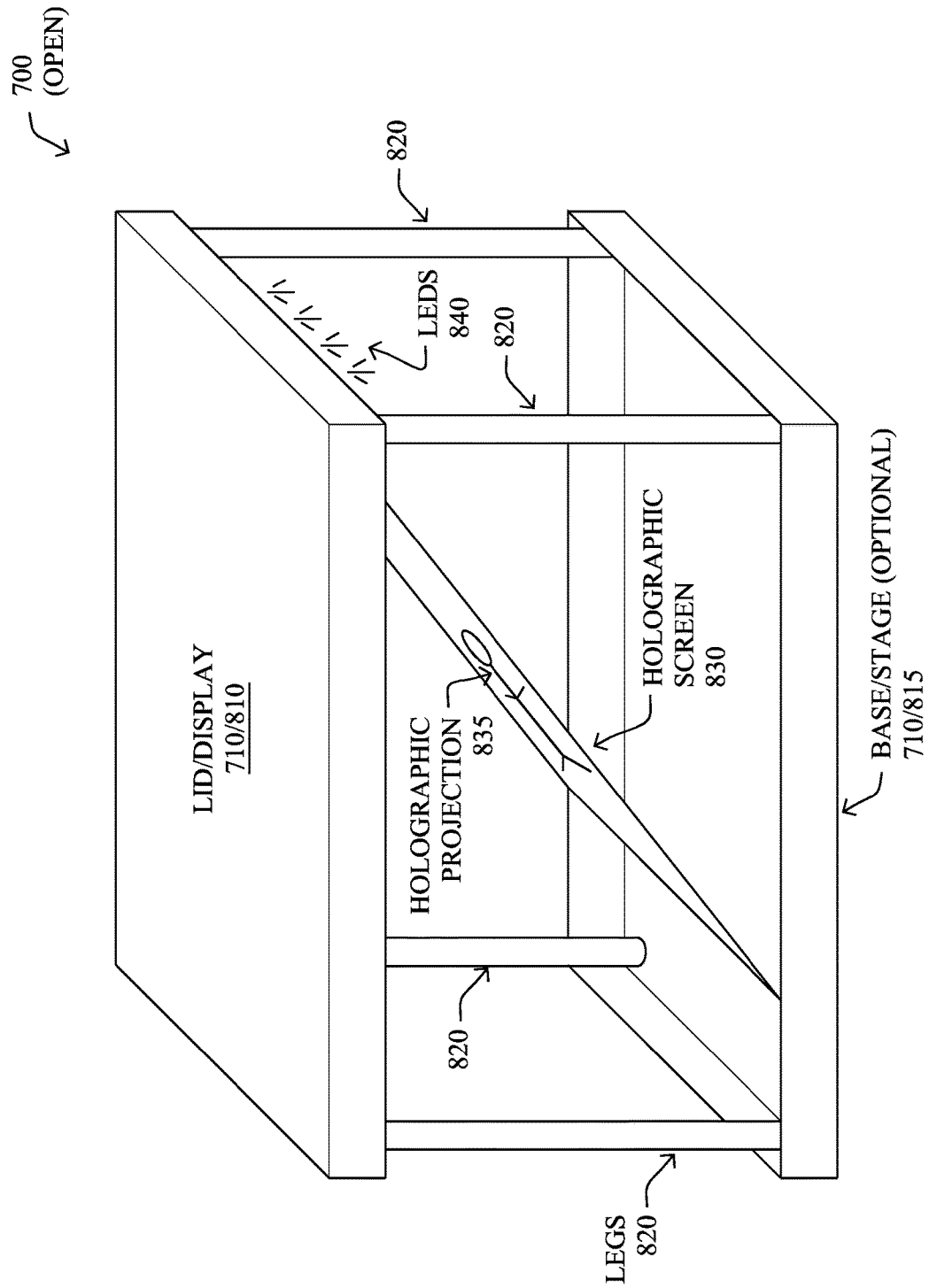
FIGS. 8A-8B illustrate an example travel case for a portable Pepper's Ghost Illusion setup in an open position in accordance with one or more embodiments herein.
Figure 8B:
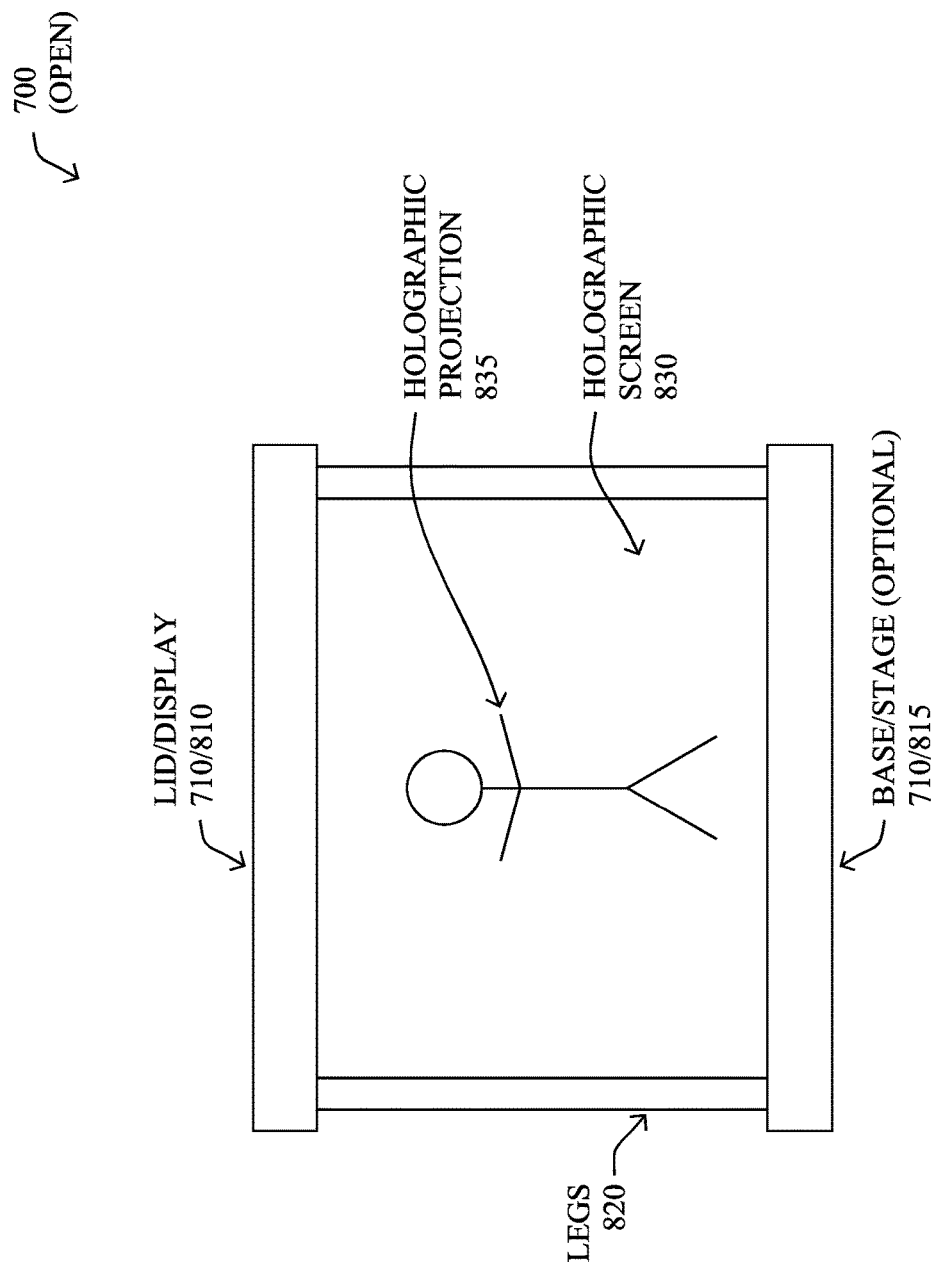

As shown in FIGS. 8A-8B, when opened, the travel case 700 provides for a portable Pepper's Ghost Illusion setup. In particular, a video panel display (e.g., LED, LCD, etc.) may be mounted to the top half ("lid") of the case 710/810, and provides the image source for the holographic image 835 that is reflected off the holographic screen/foil 830. In addition, the lid of the case 710/810 may have a supporting bracket that holds the holographic screen 830 (e.g., tensioned foil and frame or else a sheet of plastic, glass, etc.) on the illustrative 45-degree angle to the image source (extending angularly away from the image source). (Note that a base 710/815 or leg assembly 820 may be provided for the bottom of the holographic screen 830 as well for greater support, though the screen may rest on the floor or may free-hang from the lid.) The bottom half ("base") of the case 710/815 may be used as a stage or floor for the system, or else may be simply placed aside until the system is repacked. Alternatively, foam packing material (as described below) may also be used as a stage for the system.

Other various components may be configured within the travel case to operate while in the open position, such as power supplies, speakers for sound, microphones for audio pickup, cameras for video feeds, communication cabling or wireless networking devices, etc. Also, a light source 840 (e.g., LED strip) may be located on the lid of the case (e.g., mounted behind the display) to provide additional lighting to give a greater illusion of depth behind the holographic image by illuminating the stage.

Figure 9:
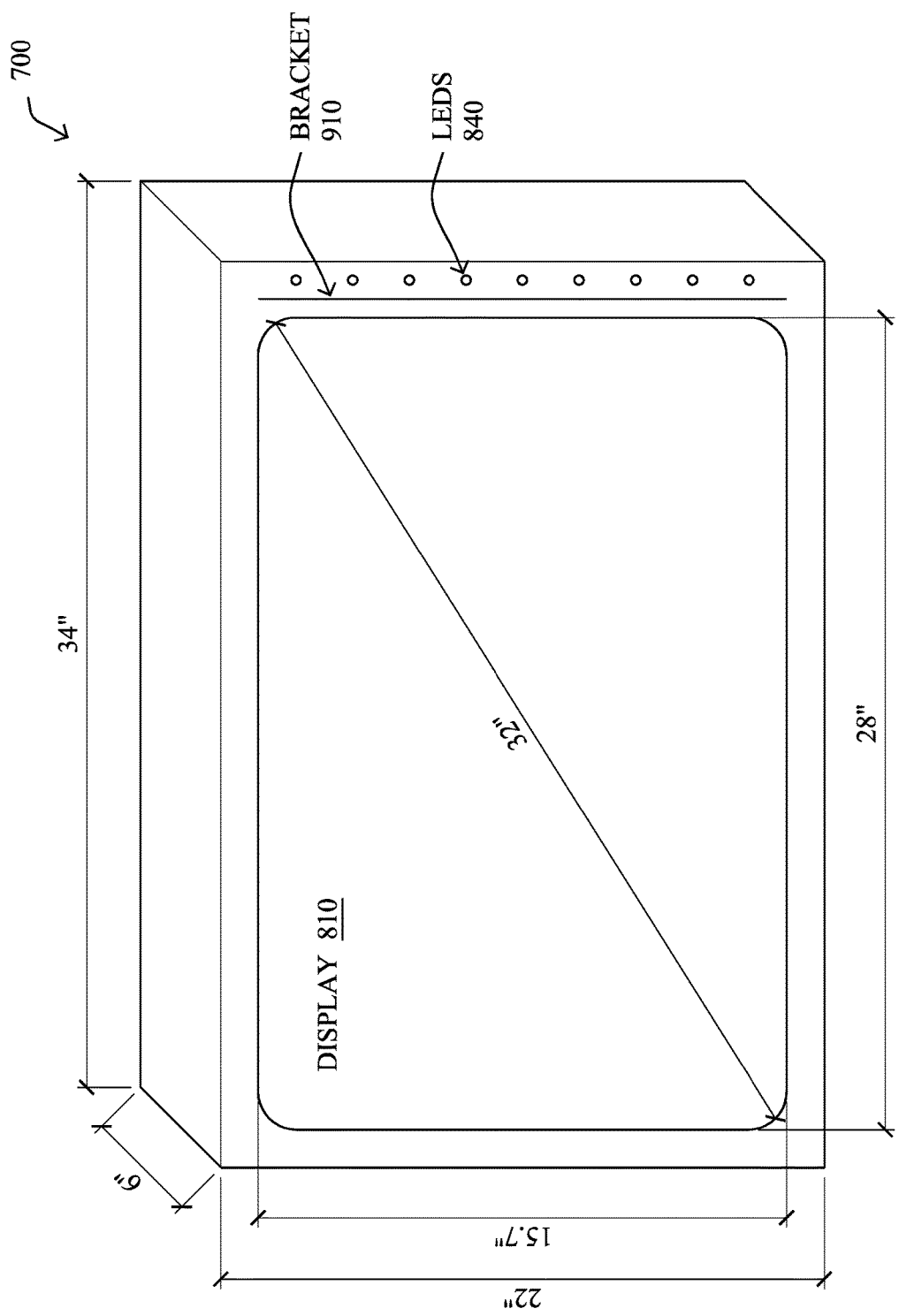
FIG. 9 illustrates an example lid for a travel case for a portable Pepper's Ghost Illusion setup carrying a video panel display in accordance with one or more embodiments herein.

FIG. 9 illustrates an example view of the case lid 710, showing the video panel display 810, which may be surrounded by an associated packaging material (e.g., foam) to help secure the display safely within the case. A supporting bracket 910 that holds the holographic screen 830 is also shown. An LED strip 840 is shown within the case lid, as mentioned above. In accordance with one specific embodiment herein, in order to comply with airline regulations for dimension, the outer dimensions of the case must total less than 62 linear inches based on adding the height, width, and depth (H+W+D) of the case. As such, in an illustrative embodiment, by using a 32-inch flat panel display, with a 16:10 widescreen aspect ratio, the dimensions of the viewable portion of the display are approximately 28 inches wide by 15.7 inches high. By adding a frame/border around the viewable portion (e.g., one-half inch to one inch), and then by adding protective packaging material such as foam or plastic (e.g., one-half inch to two inches), the outer dimension of this illustrative display becomes approximately 34 inches wide by 22 inches high. The depth of the overall packaged travel case in this illustrative embodiment may thus be up to 5-6 inches deep, in order to comply with being less than 62 inches in total dimension.

Additionally, as may be appreciated by those skilled in the art, locking mounts (e.g., threads, pins, clips, compression, etc.) may be placed in corners of the lid to support the legs. That is, custom flanges may be configured on the corners (e.g., all four corners) of the lid that allow for the legs/poles to be inserted into them and locked into place. Further, a supporting bracket or latch 910 may be positioned and angled appropriately to support the holographic screen 830, as mentioned above.

Figure 10A:
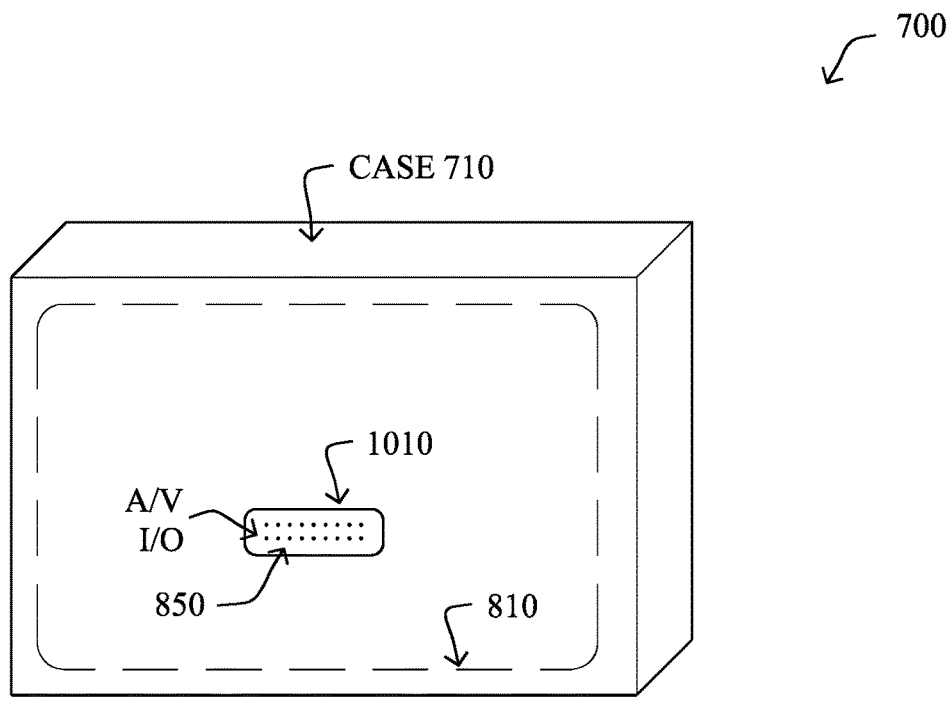
FIGS. 10A-10B illustrate another view of the example lid for a travel case for a portable Pepper's Ghost Illusion setup carrying a video panel display in accordance with one or more embodiments herein.
Figure 10B:
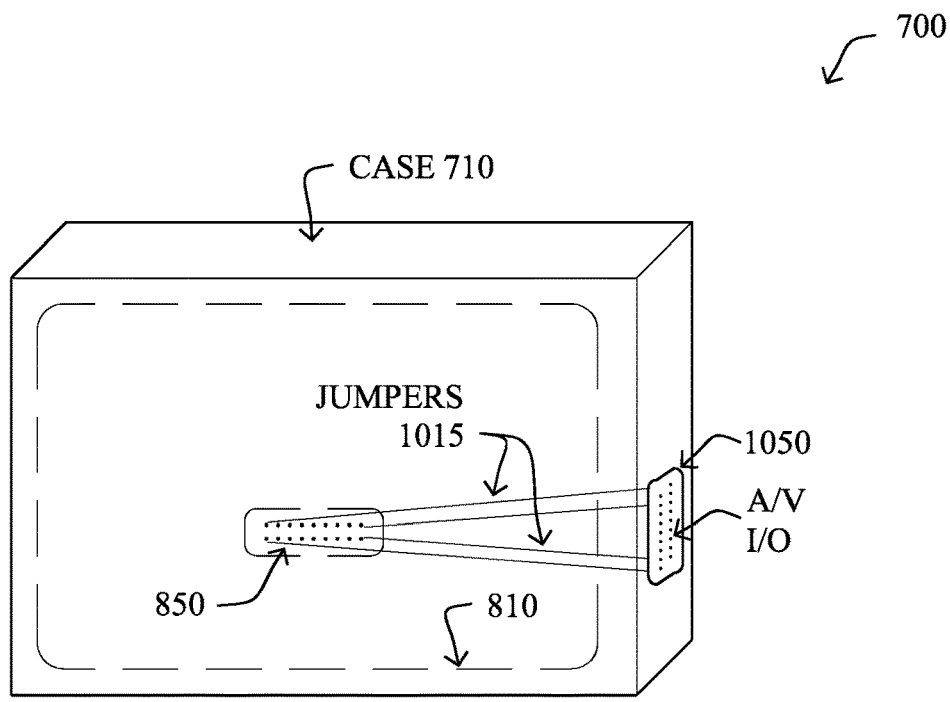

Due to the potential for tight space tolerances, as shown in FIGS. 10A-10B, various configurations for accessing the audio and video (A/V) inputs and outputs (I/O) (e.g., HDMI, SDI, USB, etc.) may be considered herein, such as either an access panel (aperture) 1010 to the video display's own A/V I/O 850 as shown in FIG. 10A, or else by pre-installing a "jumper" connection 1015 (e.g., a custom jack) from the video display's A/V I/O 850 to a separate panel on the outside access (aperture) 1050 of the case as shown in FIG. 10B to make the I/O ports easily accessible. Other configurations are possible, such as having the A/V I/O on the inside of the case, or else using wireless connections (e.g., with a power supply access, batteries, etc.).

Figure 11A:
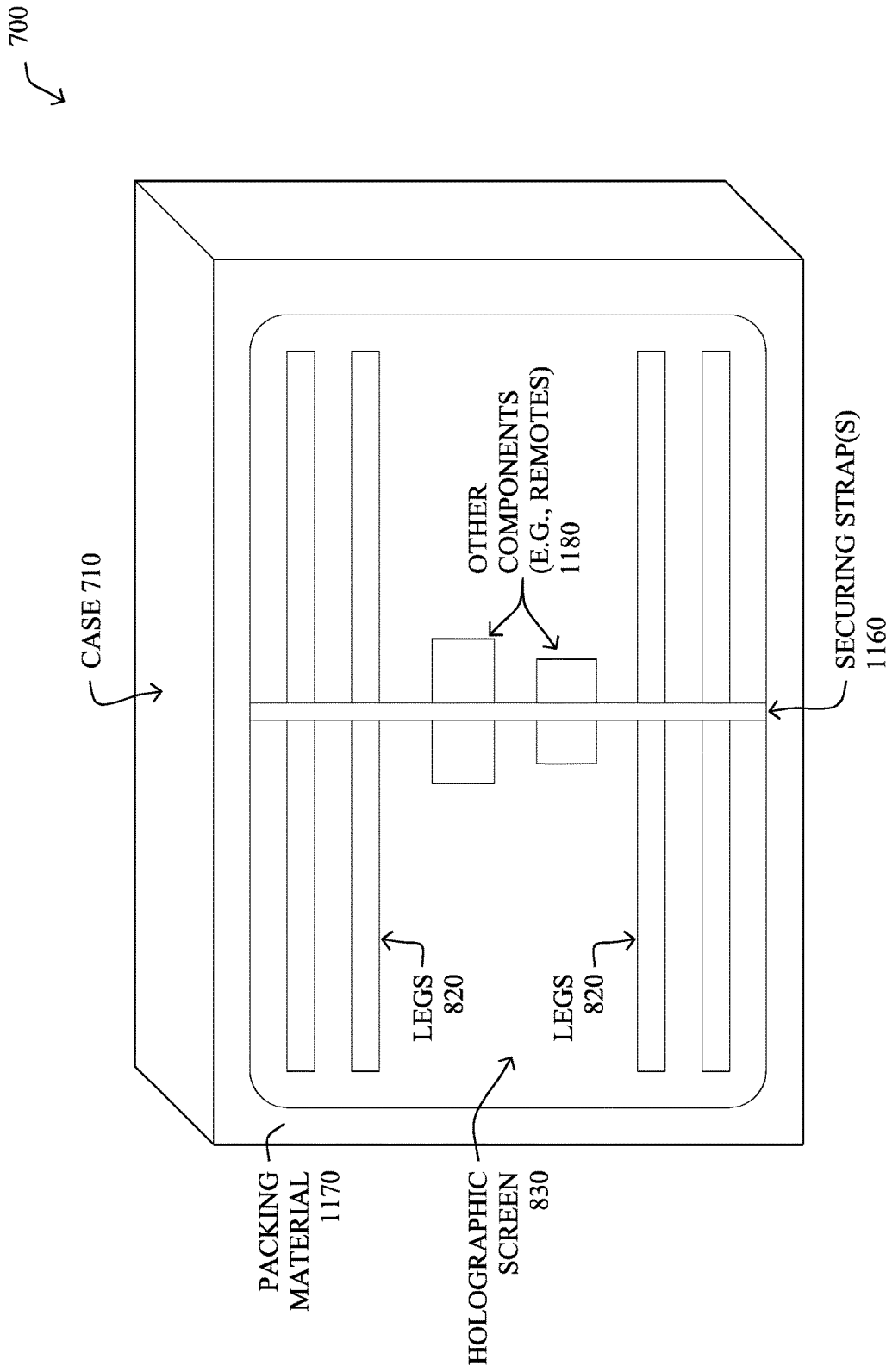
FIGS. 11A-11B illustrate an example base for a travel case for a portable Pepper's Ghost Illusion setup carrying various components in accordance with one or more embodiments herein.

The bottom half or base of the case may be configured and arranged to securely carry the holographic screen (e.g., a pre-tensioned foil) that fits within the dimensions of the case, along with legs for the lid of the display and any additional parts that may be needed. For instance, as shown in FIG. 11A, a packaging material 1170 (e.g., foam or plastic) inset may be sized to fit within the base (notably continuing beneath the holographic screen 830), and may have various supporting features (e.g., cut-outs) that are sized and arranged to hold the various components 1180 of the portable Pepper's Ghost Illusion setup, such as various remotes (e.g., for the display, lights, cameras, etc.), and the illustrative four legs 820. A securing strap 1160 may be placed above the legs and components to keep them in place within the packaging material, and preventing them from dislodging and contacting the holographic screen 830. In particular, the holographic screen 830 itself may be secured above the various components and secured within the base using the packaging material and its own corresponding strap (e.g., a soft strap, such as nylon).

Figure 11B:
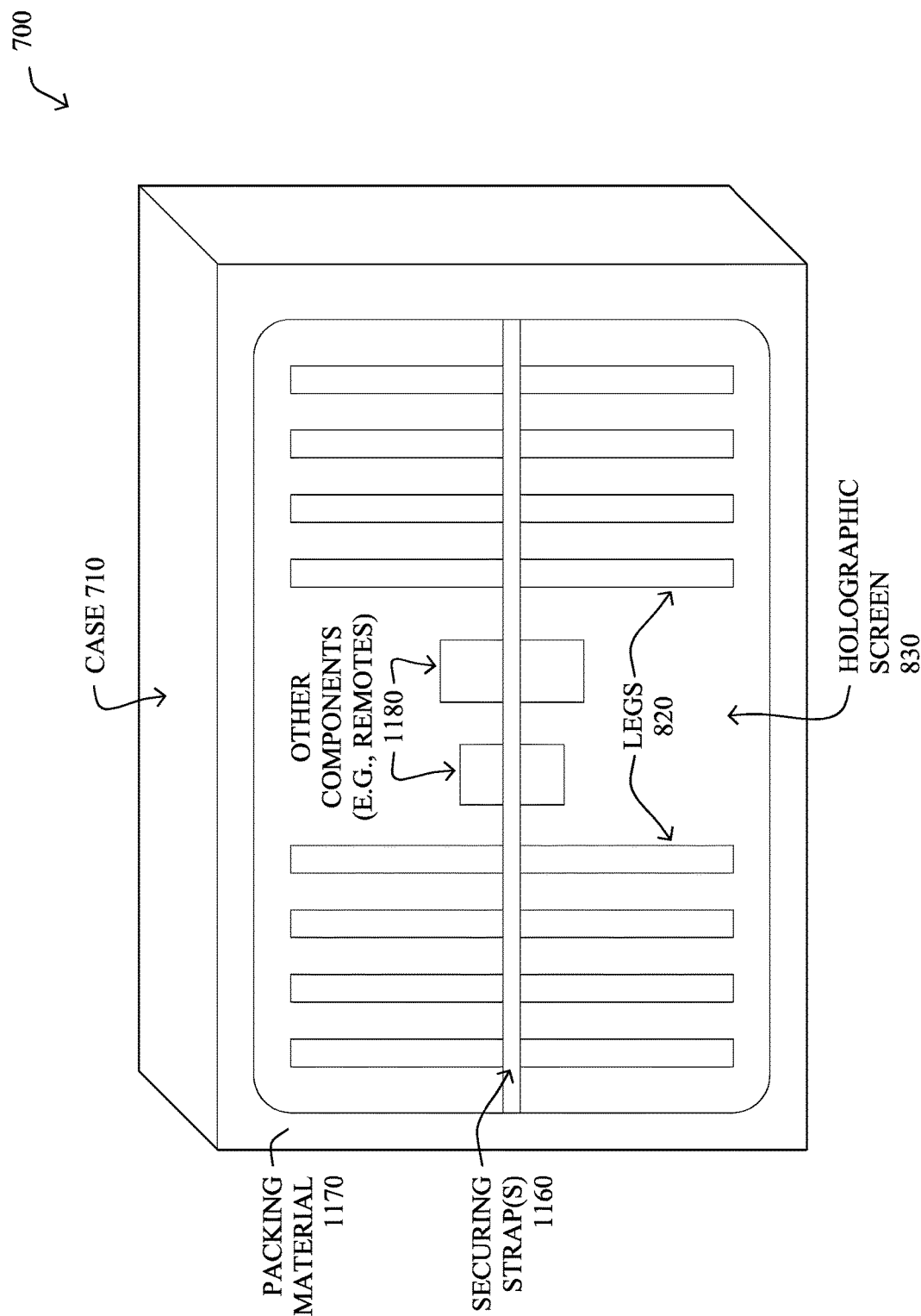

Alternatively, as shown in FIG. 11B, the legs may be separable (e.g., threading or otherwise being engaged from two or more components to make a single leg), such that the legs may be arranged in an alternative direction to being placed lengthwise as shown above in FIG. 11A. Other alternative arrangements may also be made within the base of the case, such as placing legs around the outer perimeter of the case, having legs fold out (bend, scissor, etc.), and so on. Accordingly, the examples above in FIGS. 11A-11B are not meant to be limiting to the scope of the present invention, and merely illustrate various representative and optional configurations. (Note also that the use of the terms "top" and "lid" or "bottom" and "base" need not imply any particular orientation of the parts, and components may be placed on either "side" of the case.) Furthermore, in still another alternative embodiment, rather than placing the image source on the top or "ceiling", it is possible to place it on the bottom or "floor" (flipping the unit upside down), or even on a side or wall (placing the unit sideways).

Notably, the appearance of depth behind the transparent screen is very important to the overall holographic projection effect. In certain embodiments, therefore, an optical illusion background may also be stored within the travel case and placed behind the transparent screen in order to create the illusion of depth behind the screen (producing a depth perception or "perspective" that gives a greater appearance of depth or distance behind a holographic projection).

Figure 12:
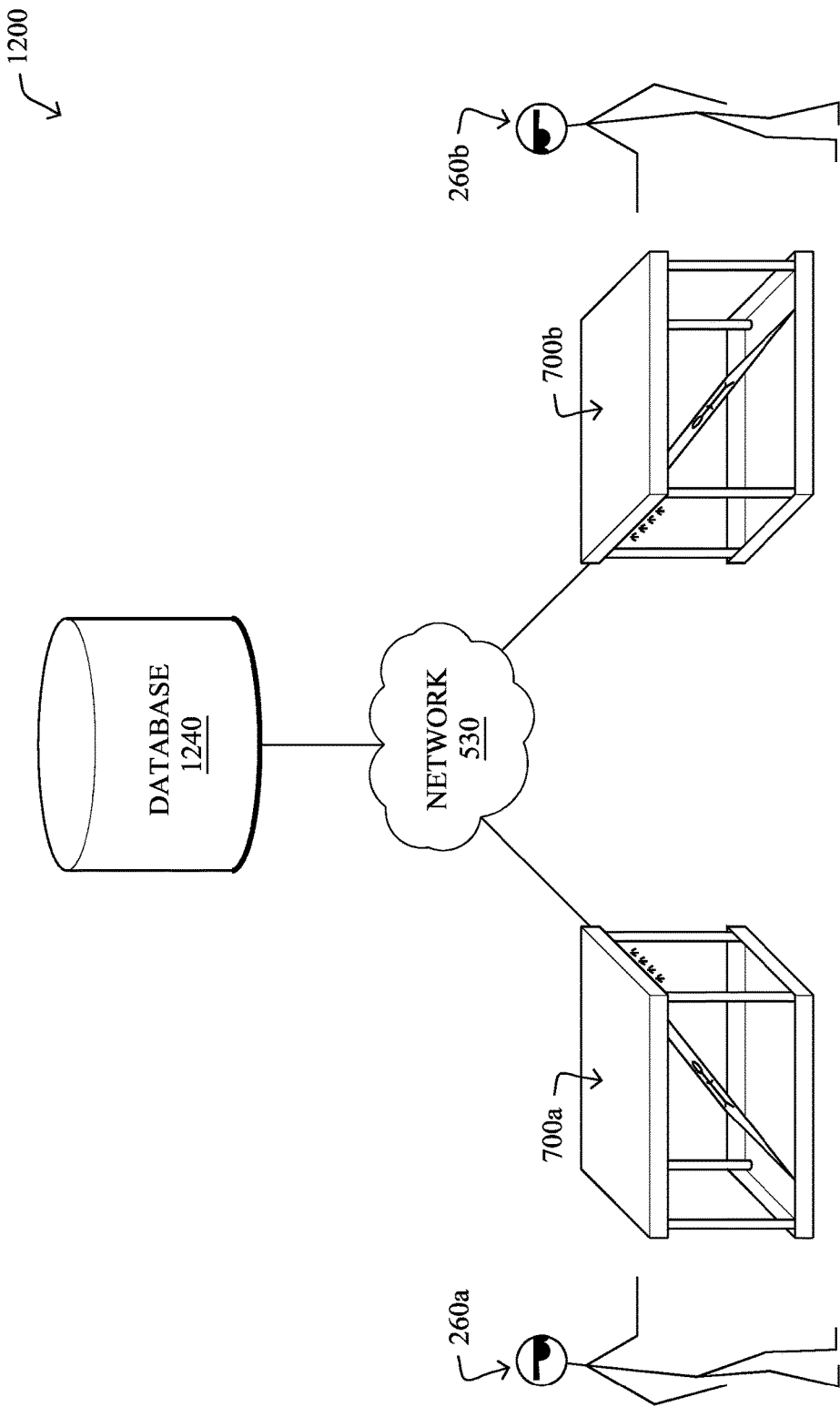
FIG. 12 illustrates an example of communication using a portable Pepper's Ghost Illusion setup carrying a video panel display in accordance with one or more embodiments herein.

The travel case as described herein may be used for any number of situations where it is beneficial to have an easily transportable Pepper's Ghost Illusion setup. For instance, while the travel case may be used to demonstrate the Pepper's Ghost Illusion generally, it may also be used for easily portable remote communication or entertainment. For example, the portable travel case 700 may be used for small-scale remote entertainment (performers, shows, etc.), or, as shown in FIG. 12, for personal communication (e.g., video chat, telepresence, etc.), whether real-time/live or pre-prerecorded (and stored locally with the case, or accessed from a networked database). For example, in a communication system 1200, each user 260a and 260b (or more) may have a corresponding travel/portable case 700a/b, which can communicate through a network 530 to each other. Still further, the travel case may be used with avatar control, such as for smaller venues or entertainment. (Note that in the case of remote avatar control, bandwidth may be saved by transmitting only the kinetic (body motion/control) data to the travel case display, where the travel case display is configured to locally render the avatar based on the remote control from the kinetic data, e.g., from avatar data/mappings from database 1240.)

Figure 13:
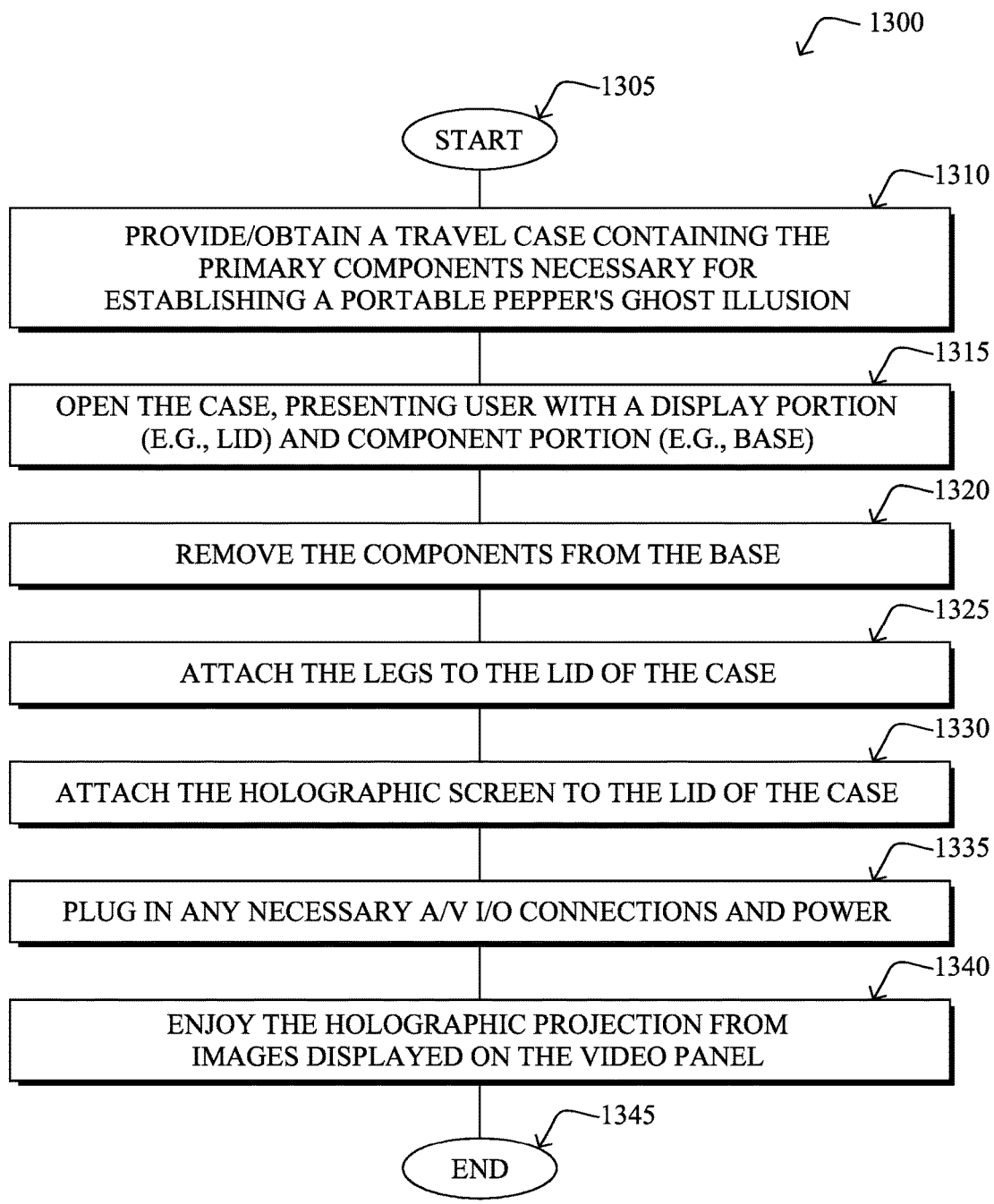
FIG. 13 illustrates an example procedure for providing and using a travel case for a portable Pepper's Ghost Illusion setup in accordance with one or more embodiments herein.

FIG. 13 illustrates an example simplified procedure for providing and using a travel case for a portable Pepper's Ghost Illusion setup in accordance with one or more embodiments described herein. The simplified procedure 1300 may start at step 1305, and continues to step 1310, where, as described above, a travel case is provided (e.g., that may comply with airline regulations), containing the primary components necessary for establishing a portable (e.g., smaller-scale) Pepper's Ghost Illusion. By opening the case in step 1315, a user is presented with the display portion (e.g., lid) and component portion (e.g., base). After removing the components from the base in step 1320, the user can then attach the legs in step 1325 and the holographic screen in step 1330 to the lid of the case. The user can then plug in any necessary A/V I/O connections and power in step 1335, and can then enjoy the holographic projection from images displayed on the video panel in step 1340. The procedure ends in step 1345, and notably may be generally reversed for repackaging of the components into the travel case, accordingly.

It should be noted that while certain steps within procedure 1300 may be optional as described above, the steps shown in FIG. 13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for a travel case for a portable Pepper's Ghost Illusion setup. In particular, as mentioned above, the techniques described herein provide a road case that folds out into a Pepper's Ghost Illusion system, allowing for extended portability.

Specifically, as described above, the portable case may be built for air travel (e.g., less than 50 pounds and less than or equal to 62 linear inches), meeting airline restrictions for both weight and dimension. The portability of the travel case, in general, allows for greater mobility for travelling displays, presentations, etc.

While there have been shown and described illustrative embodiments, it is to be understood that various other adaptations and modifications may be made within the spirit and scope of the embodiments herein. For example, the embodiments described herein may be used with holographic projection images produced from a variety of sources, such as live-streamed, pre-recorded, re-constructed, computer-generated, and so on. Also, any reference to "video" or "image" or "picture" need not limit the embodiments to whether they are motion or time-sequence photography or still images, etc. Moreover, any holographic imagery techniques may be used herein, and the illustrations provided above are merely example embodiments, whether for two-dimensional or three-dimensional holographic images.

Further, the embodiments herein may generally be performed in connection with one or more computing devices (e.g., personal computers, laptops, servers, specifically configured computers, cloud-based computing devices, cameras, etc.), which may be interconnected via various local and/or network connections. Various actions described herein may be related specifically to one or more of the devices, though any reference to particular type of device herein is not meant to limit the scope of the embodiments herein.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus that weighs less than 50 pounds, comprising:
    a case comprising a first portion, a second portion, and reinforced external metal corners, the first portion and second portion are in direct contact with each other and secured by one or more recessed latches when the apparatus is in a closed position, and separate when the apparatus is in an open position, wherein in the open position, a plurality of legs extend downward vertically from the first portion;
    an image source contained within an inside of the first portion; and
    a holographic screen contained within the apparatus when the apparatus is in the closed position, and extending angularly away from the image source when the apparatus is in the open position, wherein the image source is configured to reflect a holographic image off the holographic screen when the apparatus is in the open position,
    wherein, when the apparatus is in the closed position, the plurality of legs and holographic screen are secured within the second portion and the apparatus measures less than or equal to 62 linear inches total in height, width, and length.

2. The apparatus as in claim 1, wherein the apparatus is 34 inches wide by 22 inches high, and less than 6 inches deep when in the closed position.

3. The apparatus as in claim 1, wherein the image source is a video panel display.

4. The apparatus as in claim 3, wherein the video panel display is a 32-inch flat panel display, with an 16:10 widescreen aspect ratio.

5. The apparatus as in claim 1, further comprising:
    a remote control configured to be stored within the second portion when the apparatus is in the closed position, and removed from the second portion and used to control the image source when the apparatus is in the open position.

6. The apparatus as in claim 1, further comprising:
    at least one handle attached to the case and configured to allow carrying the apparatus in the closed position.

7. The apparatus as in claim 1, further comprising:
    a supporting bracket affixed to the first portion and configured to hold the holographic screen angularly on an illustrative 45-degree angle to the image source when the apparatus is in the open position.

8. The apparatus as in claim 1, wherein the holographic screen is selected from a group consisting of: a tensioned foil and frame; a sheet of plastic; and a sheet of glass.

9. The apparatus as in claim 1, wherein the holographic screen is configured to free-hang from the first portion when in the open position.

10. The apparatus as in claim 1, further comprising:
    a light source located within the first portion of the case and configured to illuminate a stage beneath the holographic screen.

11. The apparatus as in claim 1, further comprising:
    an access panel on the first portion configured to provide access to audio and video (A/V) inputs and outputs (I/O) of the image source.

12. The apparatus as in claim 1, further comprising:
    an audio and video (A/V) inputs and outputs (I/O) panel; and
    a jumper connection configured to connect A/V I/O of the image source to the panel.

13. The apparatus as in claim 1, further comprising:
    a network interface, wherein the apparatus is configured to communicate over a computer network, and to receive images to display as the holographic projection.

14. The apparatus as in claim 13, further comprising:
    a video capture device configured to capture images; wherein the apparatus is configured to communicate the captured images over the computer network to a remote apparatus.

* * * * *